United States Patent
Lou et al.

(10) Patent No.: US 7,995,476 B2
(45) Date of Patent: Aug. 9, 2011

(54) BANDWIDTH ALLOCATION ALGORITHM FOR PEER-TO-PEER PACKET SCHEDULING

(75) Inventors: Jian-guang Lou, Beijing (CN); Yusuo Hu, Beijing (CN); Qingwei Lin, Beijing (CN); Fan Li, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 12/328,505

(22) Filed: Dec. 4, 2008

(65) Prior Publication Data

US 2010/0142376 A1 Jun. 10, 2010

(51) Int. Cl.
 H04L 12/26 (2006.01)
(52) U.S. Cl. ............. 370/232; 370/230.1; 370/235
(58) Field of Classification Search .......... 370/229–236, 370/236.1, 236.2
 See application file for complete search history.

(56) References Cited

U.S. PATENT DOCUMENTS

| | | | | |
|---|---|---|---|---|
| 5,442,637 | A * | 8/1995 | Nguyen | 714/708 |
| 6,317,714 | B1 | 11/2001 | Del Castillo et al. | |
| 7,376,121 | B2 | 5/2008 | Dunagan et al. | |
| 2001/0053127 | A1* | 12/2001 | Horioka et al. | 370/232 |
| 2002/0080721 | A1* | 6/2002 | Tobagi et al. | 370/236 |
| 2002/0118639 | A1* | 8/2002 | Chintada et al. | 370/230 |
| 2002/0176361 | A1 | 11/2002 | Wu et al. | |
| 2003/0026207 | A1* | 2/2003 | Loguinov | 370/235 |
| 2003/0084108 | A1 | 5/2003 | Syed | |
| 2005/0068894 | A1* | 3/2005 | Yu et al. | 370/235 |
| 2005/0128951 | A1 | 6/2005 | Chawla et al. | |
| 2005/0254420 | A1* | 11/2005 | Wager et al. | 370/230 |
| 2006/0053209 | A1* | 3/2006 | Li | 709/217 |
| 2006/0092836 | A1* | 5/2006 | Kwan et al. | 370/229 |
| 2006/0146875 | A1* | 7/2006 | Yang | 370/468 |
| 2006/0187874 | A1* | 8/2006 | Zaki | 370/328 |
| 2006/0209898 | A1* | 9/2006 | Abdelilah et al. | 370/477 |
| 2008/0112315 | A1 | 5/2008 | Hu et al. | |
| 2009/0113069 | A1* | 4/2009 | Prabhakar et al. | 709/235 |

OTHER PUBLICATIONS

Banerjee, et al., "A Comparative Study of Application Layer Multicast Protocols", retrieved on Oct. 13, 2008 at <<http://wmedia.grnet.gr/P2PBackground/a-comparative-study-ofALM.pdf>>, under submission, 2006, pp. 1-9.

Banerjee, et al., "Resilient Multicast using Overlays", retrieved on Oct. 13, 2008 at <<http://www.cs.umd.edu/~slee/pubs/prm-sigmetrics03.pdf>>, ACM (1-58113-664-1/03/0006, SIGMETRICS 03), 2003, pp. 1-12.

Banerjee, et al., "Scalable Application Layer Multicast", retrieved on Oct. 13, 2008 at <<http://www.cs.umd.edu/users/suman/pubs/sigcomm02.pdf>>, ACM (1-58113-570-X/02/0008, SIGCOMM 02), 2002, pp. 1-13.

Bolot, "Characterizing End-to-End Packet Delay and Loss in the Internet", retrieved on Oct. 13, 2008 at <<http://citeseerx.ist.psu.edu/viewdoc/download?doi=10.1.1.40.3609&rep=rep1&type=pdf>>, Journal of High-Speed Networks, vol. 2, No. 3, pp. 305-323.

Castro, et al., "SplitStream: High-Bandwidth Multicast in Cooperative Environments", retrieved on Oct. 13, 2008 at <<http://research.microsoft.com/~antr/PAST/SplitStrearm-sosp.pdf>>, ACM (1-58113-757-5/03/0010, SOSP 03), 2003, pp. 1-16.

(Continued)

*Primary Examiner* — Kwang B Yao
*Assistant Examiner* — Juvena Loo
(74) *Attorney, Agent, or Firm* — Lee & Hayes, PLLC

(57) ABSTRACT

Method and system for altering a sending rate of media packets in a peer-to-peer network that includes a client node and a plurality of serving peer nodes.

20 Claims, 8 Drawing Sheets

OTHER PUBLICATIONS

Cen, et al., "Flow and Congestion Control for Internet Media Streaming Applications", retrieved on Oct. 13, 2008 at <<http://reference.kfupm.edu.sa/content/f/l/flow_and_congestion_control_for_internet_132268.pdf>>, Oregon Graduate Institute of Science and Technology (CSE-97-003), 1997, pp. 1-14.

Chawathe, et al., "An Architecture for Internet Content Distribution as an Infrastructure Service", retrieved on Oct. 13, 2008 at <<http://citeseerx.ist.psu.edu/viewdoc/download;jsessionid=65F2661CBC1E345DA1C1A4F577ACA52C?doi=10.1.1.35.1680&rep=rep1&type=pdf>>, unpublished, 2000, pp. 1-14.

Chen, et al., "Real Time Video and Audio in the World Wide Web", retrieved Oct. 13, 2008 at <<https://eprints.kfupm.edu.sa/60948/1/60948.pdf>>, World Wide Web Journal, 1995, pp. 1-12.

Chiu, et al, "Analysis of the Increase and Decrease Algorithms for Congestion Avoidance in Computer Networks", retrieved on Oct. 13, 2008 at <<http://www.cs.rice.edu/~eugeneng/teaching/f05/comp529/papers/cj89.pdf>>, Elsevier Science Publishers B.V. (0169-7552/89) 1989, pp. 1-14.

Chu, et al., "A Case for End System Multicast", retrieved on Oct. 13, 2008 at <<http://www.cs.virginia.edu/~cs757/papers/Narada-paper.pdf>>, ACM (1-58113-194-1/00/0006, SIGMETRICS 00), 2000, pp. 1-12.

Chu, et al., "Early Experience with an Internet Broadcast System Based on Overlay Multicast", retrieved on Oct. 13, 2008 at <<http://www.cs.cmu.edu/~sanjay/Papers/techreport.pdf>>, USENIX Technical Conference, 2004, pp. 1-15.

Cui, et al., "Layered Peer-to-Peer Streaming", retrieved on Oct. 13, 2008 at <<http://cairo.cs.uiuc.edu/publications/papers/nossdav2003-yicui.pdf>>, ACM (1-58113-694-3/03/0006, NOSSDAV 03), 2003, pp. 1-10.

Cui, et al., "oStream: Asynchronous Streaming Multicast in Application-Layer Overlay Networks", retrieved on Oct. 13, 2008 at <<http://www.eecg.utoronto.ca/~bli/papers/jsac-ostream.pdf>>, IEEE Journal, vol. 22, No. 1, 2004, pp. 1-13.

Deshpande, et al., "Streaming Live Media over Peer-to-Peer Network", retrieved on Oct. 13, 2008 at <<http://dbpubs.stanford.edu:8090/cgi-bin/makehtml.cgi?document=2001/31&format=0&page=1>>, Stanford University Technical Report, 2001, pp. 1-15.

Eugster, et al., "From Epidemics to Distributed Computing", retrieved on Oct. 13, 2008 at http://se.inf.ethz.ch/people/eugster/papers/gossips.pdf>>, IEEE Computer, vol. 37, No. 5, 2004, pp. 60-67.

Fall, et al., "Simulation-based Comparison of Tahoe, Reno and SACK TCP", retrieved on Oct. 13, 2008 at <<http://delivery.acm.org/10.1145/240000/235162/p5-fall.pdf?key1=235162&key2=3620693221&coll=GUIDE&dl=GUIDE&CFID=6331466&CFTOKEN=79005673>> ACM (SIGCOMM 96), vol. 26, Issue 3, 1996, pp. 5-21.

Floyd, et al., "Connections with Multiple Congested Gateways in Packet-Switched Networks Part 1: One-way Traffic", retrieved on Oct. 13, 2008 at <<http://delivery.acm.org/10.1145/130000/122434/p30-floyd.pdf?key1=122434&key2=5401693221&coll=GUIDE&dl=GUIDE&CFID=6332439&CFTOKEN=36906736>> ACM (SIGCOMM 91), vol. 21, Issue 5, 1991, pp. 30-47.

Floyd, et al., "On Traffic Phase Effects in Packet-Switched Gateways", retrieved Oct. 13, 2008 at <<http://www-nrg.ee.lbl.gov/papers/phase.pdf>>, Internetworking: Research and Experience, vol. 3, No. 3, 1992, pp. 115-156.

Floyd, et al., "Random Early Detection Gateways for Congestion Avoidance", retrieved on Oct. 13, 2008 at <<http://delivery.acm.org/10.1145/170000/169935/p397-floyd.pdf?key1=169935&key2=9290693221&coll=GUIDE&dl=GUIDE&CFID=6332406&CFTOKEN=78370309>>, IEEE/ACM (1063,6692/93), vol. 1, No. 4, 1993, pp. 397-413.

Gafni, et al., "Dynamic Control of Session Input Rates in Communication Networks", retrieved on Oct. 13, 2008 at <<http://ieeexplore.ieee.org/stamp/stamp.jsp?arnumber=1103431&isnumber=24208>>, IEEE (0018-9286/84/1100-1009), vol. AC-29, No. 11, 1984, pp. 1009-1016.

Ganesh, et al., "Peer-to-Peer Membership Management for Gossip-based Protocols", retrieved on Oct. 14, 2008 at <<http://ieeexplore.ieee.org/stamp/stamp.jsp?arnumber=1176982&isnumber=26428>>, IEEECS (0018-9340/03), vol. 52, No. 2, 2003, pp. 139-149.

Guo, et al., "P2Cast: Peer-to-Peer Patching Scheme for VoD Service", retrieved on Oct. 13, 2008 at <<P2Cast: Peer-to-Peer Patching Scheme for VoD Service>>, ACM (1-58113-680-03/03/0005, WWW2003), 2003, pp. 1-9.

Guo, et al., "PROP: A Scalable and Reliable P2P Assisted Proxy Streaming System", retrieved Oct. 14, 2008 at <<http://ieeexplore.ieee.org/stamp/stamp.jsp?arnumber=1281646&isnumber=28619>>, IEEE (1063-6927/04, ICDCS 04), 2004, pp. 1-9.

Handley, et al., "TCP Friendly Rate Control (TFRC): Protocol Specification", retrieved on Oct. 13, 2008 at <<http://citeseerx.ist.psu.edu/viewdoc/summary?doi=10.1.1.12.24>>, Network Working Group (Internet Official Protocol Standards, STD 1, RFC 3448), 2003, pp. 1-25.

Hefeeda, et al., "A Hybrid Architecture for Cost-Effective On-Demand Media Streaming", retrieved on Oct. 13, 2008 at <<http://wmedia.grnet.gr/P2PBackground/CHECKjcn.pdf>>, Computer Networks Journal, vol. 44, 2004, pp. 353-382.

Hefeeda, et al., "PROMISE: Peer-to-Peer Media Streaming using CollectCast", retrieved on Oct. 13, 2008 at http://dslab.csie.ncu.edu.tw/94html/paper/pdf/PROMISE:%20Peer-to-Peer%20Media%20Streaming%20Using%20Collectcast.pdf>>, ACM (1-58113-722-2/03/001, MM 03), 2003, pp. 1-10.

Jacobs, et al., "Real-time Dynamic Rate Shaping and Control for Internet Video Applications", retrieved on Oct. 14, 2008 at <<http://ieeexplore.ieee.org/stamp/stamp.jsp?arnumber=602693&isnumber=13276>>, IEEE (0-7803-3780-8/97), 1997, pp. 558-563.

Jacobson, "Congestion Avoidance and Control", retrieved on Oct. 13, 2008 at <<http://delivery.acm.org/10.1145/60000/52356/p314-jacobson.pdf?key1=52356&key2=5531693221&coll=GUIDE&dI=GUIDE&CFID=6172748&CFTOKEN=83920139>>, ACM (0-89791-279-9/88/008/0314, SIGCOMM 88), 1988, pp. 314-329.

Jaffe, "Bottleneck Flow Control", retrieved on Oct. 13, 2008 at <<http://ieeexplore.ieee.org/stamp/stamp.jsp?arnumber=1095081&isnumber=23940, IEEE (0090-6778/81/0700-0954), vol. COM-29, No. 7, 1981, pp. 954-962.

Jain, "A Delay-based Approach for Congestion Avoidance in Interconnected Heterogeneous Computer Networks", retrieved on Oct. 18, 2008 at <<http://www.cse.wustl.edu/~jain/papers/ftp/delay.pdf>>, Computer Communications Review, ACM SIGCOMM, 1989, pp. 56-71.

Jain, "Congestion Avoidance in Computer Networks with a Connectionless Network Layer: Concepts. Goals and Methodology", retrieved on Oct. 13, 2008 at <<http://arxiv.org/ftp/cs/papers/9809/9809094.pdf>>, Digital Equipment Corporation (DEC-TR-506), 1988, pp. 1-21.

Jin, et al., "Cache-and-Relay Streaming Media Delivery for Asynchronous Clients", retrieved on Oct. 13, 2008 at <<http://www.cs.bu.edu/faculty/best/res/papers/ngc02.pdf>>, ACM (1-58113-619-06/02/0010), 2002, pp. 1-8.

Jurca, et al., "Enabling Adaptive Video Streaming in P2P Systems", retrieved on Oct. 13, 2008 at <<http://lts4www.epfl.ch/~frossard/publications/pdfs/commmag07b.pdf>>, IEEE Communications Magazine, vol. 45, No. 6, 2007, pp. 108-114.

Kostic, et al., "Bullet: High Bandwidth Data Dissemination using an Overlay Mesh", retrieved on Oct. 13, 2008 at http:// www.cs.duke.edu/~vahdat/ps/bullet-sosp03.pdf>>, ACM (1-58113-757-5/03/0010, SOSP 03), 2003, pp. 1-16.

Liu, et al., "Adaptive Video Multicast over the Internet", retrieved on Oct. 13, 2008 at <<http://ieeexplore.ieee.org/stamp/stamp.jsp?arnumber=11679198&isnumber=26330>>, IEEE (1070-986X/03), 2003, pp. 22-33.

Magharei, et al., "Prime: Peer-to-Peer Receiver-Driven Mesh Based Streaming", retrieved on Oct. 13, 2008 at <<http://ieeexplore.ieee.org/xpls/abs_all.jsp?arnumber=4215749>>, IEEE (0743-166X/07, INFOCOM 07), 2007, pp. 1415-1423.

Magharei, et al., "Understanding Mesh based Peer-to-Peer Streaming", retrieved Oct. 13, 2008 at <<http://ix.cs.uoregon.edu/~reza/PUB/nossdav06.pdf>>, ACM (1-59593-285-02/06/0005, NOSSDAV 06), 2006, pp. 1-6.

Mandavi, et al., "TCP-Friendly Unicast Rate-Based Flow Control", retrieved on Oct. 14, 2007 at <<http://www.psc.edu/networking/papers/tcp-friendly.html.>>, 1997, pp. 1-4.

Mathis, et al., "TCP Selective Acknowledgement Options", retrieved on Oct. 14, 2008 at http://ipsysctl-tutorial.frozentux.net/other/rfc2018.txt>>, Network Working Group (Internet Official Protocol Standards, STD 1), RFC 2018, 1996, pp. 1-12.

Mathis, et al., "The Macroscopic Behavior of the TCP Congestion Avoidance Algorithm", retrieved on Oct. 13, 2008 at <<http://www.cse.ucsd.edu/classes/wi01/cse222/papers/mathis-tcpmodel-ccr97.pdf>>, ACM (SIGCOMM 97), vol. 27, No. 3, 1997, pp. 1-16.

Mishra, et al., "A Hop by Hop Rate-based Congestion Control Scheme", retrieved on Oct. 13, 2008 at <<http://delivery.acm.org/10.1145/150000/144254/p112-mishra.pdf?key1=144254&key2=5191693221&coll=GUIDE&dl=GUIDE&CFID=6334172&CFTOKEN=35845448,>>ACM (COMM'92, 0-89791-526-7/92/0008/0112), 1992, pp. 112-123.

Morris, "TCP Behavior with Many Flows", retrieved on Oct. 14, 2008 at http://ieeexplore.ieee.org/stamp/stamp.jsp?arnumber=643715&isnumber=13855>>, IEEE (-8186-8061-X/97, Intl Conference on Network Protocols), 1997, pp. 205-211.

"Ns (Network Simulator), The Network Simulator—ns-2", retrieved on Oct. 14, 2008 at <<http://www-mash.cs.berkeley.edu/ns.>>, pp. 1-2.

Ortega, et al., "Rate Control for Video Coding over Variable Bit Rate Channels with Applications to Wireless Transmission", retrieved on Oct. 13, 2008 at <<http://citeseerx.ist.psu.edu/viewdoc/download?doi=10.1.1.13.9036&rep=rep1&type=pdf>>, IEEE (ICIP 95), 1995, pp. 1-4.

Padhye, et al., "Modeling TCP Throughput: A Simple Model and Its Empirical Validation", retrieved on Oct. 13, 2008 at <<http://www.ecse.rpi.edu/Homepages/shivkuma/teaching/sp2001/readings/Padhye98.pdf>>, ACM (SIGCOMM 98), vol. 28, Issue 4, 1998, pp. 303-314.

Padmanabhan, et al., "Distributing Streaming Media Content using Cooperative Networking", Microsoft Research (MSR-TR-2002-37), 2002, pp. 1-13.

Pai, et al., "Chainsaw: Eliminating Trees from Overlay Multicast", retrieved on Oct. 13, 2008 at <<http://iptps05.cs.cornell.edu/PDFs/CameraReady_164.pdf>>, Springer (Peer-to-Peer Systems IV, IPTPS 2005), vol. 3640, 2005, pp. 127-140.

"Planetlab", retrieved on Oct. 13, 2008 at <<http://www.planet-lab.org/>>, Princeton University, 2007, pp. 1.

"Progressive Networks. Http Versus Realaudio Client-server Streaming", retrieved on Oct. 14, 2008 at <<http://www.realaudio.com/help/content/http-vs-ra.html,>>, RealPlayer—the best digital media player—Real.com, pp. 1.

Ramakrishnan, et al., "A Binary Feedback Scheme for Congestion Avoidance in Computer Networks with a Connectionless Network Layer", retrieved on Oct. 13, 2008 at <<http://www.research.att.com/~kkrama/papers/DECbit-TOCOS-1990.pdf>>, ACM (0734-2071/90/0500-0158), vol. 8, No. 2, 1990, pp. 158-181.

Ratnasamy, et al., "Topologically-Aware Overlay Construction and Server Selection", retrieved on Oct. 13, 2008 at <<http://berkeley.intel-research.net/sylvia/infocom02.pdf>>, Proceedings of INFOCOM, 2002, pp. 1-10.

Rejaie, et al., "PALS: Peer to Peer Adaptive Layered Streaming", retrieved on Oct. 13, 2008 at <<http://inst.eecs.berkeley.edu/~cs294-9/fa03/readings/rejaie-pals-peer-to-peer.pdf>>, ACM (1-58113-694-03/03/0006, NOSSDAV 03), 2003, pp. 1-9.

Shang, et al., "An Enhanced Packet Scheduling Algorithm for QoS Support in IEEE 802.16 Wireless Network", retrieved on Oct. 13, 2008 at <<http://www.springerlink.com/content/6ufgvx64vy6v1caq/fulltext.pdf>>, Springer-Verlag (ICCNMC 2005, LNCS 3619), 2005, pp. 652-661.

Shenker, "A Theoretical Analysis of Feedback Flow Control", retrieved on Oct. 13, 2008 at <<http://delivery.acm.org/10.1145/100000/99547/p156-shenker.pdf?key1=99547&key2=9832693221&coll=GUIDE&dl=GUIDE&CFID=6334856&CFTOKEN=76848022>>, ACM. (089791-405-9/90/0009/0156), 1990, pp. 156-165.

Shi, et al., "Routing in Overlay Multicast Networks", retrieved on Oct. 14, 2008 at <<http://ieeexplore.ieee.org/stamp/stamp.jsp?arnumber=1019370&isnumber=21923>>, IEEE (0-7803-7476-2/02, INFOCOM 02), 2002, pp. 1200-1208.

Small, et al., ""Outreach: Peer-to-Peer Topology Construction towards Minimized Server Bandwidth Costs"", retrieved on Oct. 14, 2008 at <<http://ieeexplore.ieee.org/xpl/freeabs_all.jsp?arnumber=4062562, IEEE Journal (0733-8716), vol. 25, No. 1, 2007, pp. 35-45.

Smiljanic, "Flexible Bandwidth Allocation in High-Capacity Packet Switches", retrieved on Oct. 13, 2008 at <<http://delivery.acm.org/10.1145/510000/508336/00993308.pdf?key1=508336&key2=5403983221&coll=GUIDE&dl=GUIDE&CFID=60575988& CFTOKEN=86506663>>, IEEE/ACM Transactions on Networking, vol. 10, No. 2, 2002, pp. 287-293.

Tran, et al., "A Peer-to-Peer Architecture for Media Streaming", retrieved on Oct. 13, 2008 at <<http://ieeexplore.ieee.org/stamp/stamp.jsp?arnumber=1258120&isnumber=281>>, IEEE Journal (0733-8716/04), vol. 22, No. 1, 2004, pp. 121-133.

Venkataraman, et al., "Chunkyspread: Multi-tree Unstructured End System Multicast", retrieved on Oct. 13, 2008 at <<http://iptps06.cs.ucsb.edu/papers/Venkat-chunky06.pdf>>,IPTPS 06, 2006, pp. 1-6.

Wang, et al., "R2: Random Push with Random Network Coding in Live Peer-to-Peer Streaming", retrieved on Oct. 13, 2008 at <<http://www.eecg.toronto.edu/-bli/papers/mwang-jsac07.pdf>>, IEEE Journal (0733-8716/07), vol. 25, No. 9, 2007, pp. 1-12.

Wang, et al., "Stable Peers: Existence, Importance, and Application in Peer-to-Peer Live Video Streaming", retrieved on Oct. 14, 2008 at <<http://ieeexplore.ieee.org/xpls/abs_all.jsp?arnumber=4509789>>, IEEE (978-1-4244-2026-1/08, INFOCOM 08), 2008, pp. 2038-2046.

Xu, et al., "On Peer-to-Peer Media Streaming", retrieved on Oct. 13, 2008 at <<http://citeseerx.ist.psu.edu/viewdoc/download?doi=10.1.1.18.5392&rep=rep1&type=pdf>>, IEEE (ICDCS 02), 2002, pp. 1-9.

Yang, et al., "A Proactive Approach to Reconstructing Overlay Multicast Trees", retrieved on Oct. 13, 2008 at <<http://www.ieee-Infocom.org/2004/Papers/56_5.PDF>>, IEEE (0-7803-8356-7/04, INFOCOM'04), 2004, pp. 1-11.

Zhang, et al., "A Construction of Locality-Aware Overlay Network: mOverlay and its Performance", retrieved on Oct. 13, 2008 at <<http://ieeexplore.ieee.org/stamp/stamp.jsp?arnumber=1258112&isnumber=28139>>, IEEE Journal (0733-8716/04), vol. 22, No. 1, 2004, pp. 18-28.

Zhang, et al., "Coolstreaming/DONet: A Data-Driven Overlay Network for Efficient Media Streaming", retrieved Oct. 13, 2008 at <<http://www.cs.sfu.ca/~jcliu/Papers/CoolStreaming.pdf>>, IEEE INFOCOM, 2005, pp. 1-14.

Zhang, et al., "Understanding the Power of Pull-Based Streaming Protocol: Can We Do Better?", retrieved on Oct. 13, 2008 at <<http://ieeexplore.ieee.org/stamp/stamp.jsp?arnumber=4395127&isnumber=4395118>>, IEEE Journal (0733-8716/07), vol. 25, No. 9, 2007, pp. 1678-1694.

Zhuang, et al., "Bayeux: An Architecture for Scalable and Fault-Tolerant Wide-Area Data Dissemination", retrieved on Oct. 13, 2008 at <<http://www.cs.ucsb.edu/~ravenben/publications/pdf/bayeux.pdf>>, ACM (NOSSDAV), 2001, pp. 1-9.

* cited by examiner

BANDWIDTH ALLOCATION ALGORITHM FOR PEER-TO-PEER PACKET SCHEDULING

BACKGROUND

Servers on the Internet may use Unicast techniques to stream media to clients, where each media streaming client may establish a separate data channel with the server to receive an identical copy of the original media stream. When the number of media streaming clients increases, the bandwidth of the server may be exhausted. Therefore, such a transmission scheme may not be scalable and cannot support large scale video services or applications To avoid the drawbacks of the client-server model, peer-to-peer technology (P2P) technology may be employed, which can be more robust and more efficient than the pure client-server model. The basic idea of P2P networks is to allow each peer node to assist the server (e.g. media server) in distributing data (e.g. streaming media). A client in a P2P system may not only consume data (e.g. video data) through its download bandwidth, but may share its video data to other peers through its uploading bandwidth.

In certain cases, more than 60% of network traffic over the current Internet may be P2P, with approximately 60% of P2P traffic being video. For last-mile providers, P2P may comprise more than 80% of their traffic. P2P networking is a promising method for delivering video streams to a large scale of peers over the Internet without extra server bandwidth.

Receiver-driven scheduling algorithms (e.g. pull-based packing scheduling algorithm) are employed by most P2P streaming systems, wherein receivers decide which media packets or sub-streams are subscribed to. Furthermore, many P2P users are asymmetric digital subscriber line (ADSL) users whose uploading bandwidth is often smaller than their downloading bandwidth. A key problem of a P2P streaming system is the design of a receiver-driven scheduling algorithm to fully utilize the available bandwidth of the asymmetric peers. Therefore, there remains a need to improve a receiver-driven scheduling algorithm in a P2P streaming system.

SUMMARY

This summary is provided to introduce concepts relating to remote auto provisioning and publication of applications. These concepts are further described below in the detailed description. The presented summary is not intended to identify essential features of the claimed subject matter, nor is it intended for use in determining the scope of the claimed subject matter.

A bandwidth allocation algorithm based on receiver-driven rate controller and queue size controller is presented. The utilization of uploading bandwidth of asymmetric DSL peers in a peer-to-peer network may be improved.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed to techniques for sharing a media stream (or a portion thereof) from one node to a differing node of a peer-to-peer (P2P) network.

Transmission System

Figure 1:
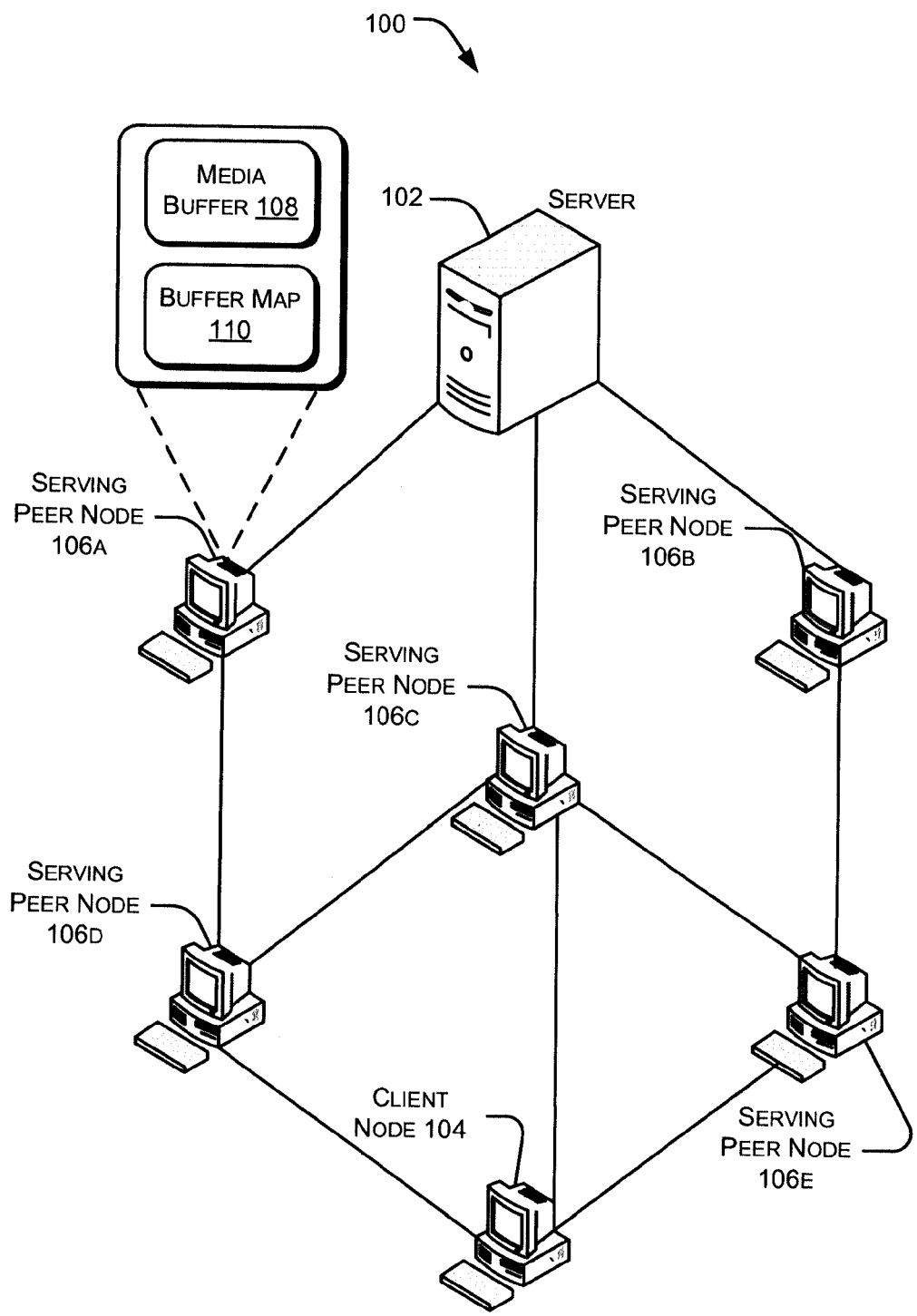
FIG. 1 is a block diagram illustrating a peer-to-peer network.

FIG. 1 shows a P2P network 100. P2P network 100 includes a server 102, client node 104, and serving peer nodes 106a-106e, where serving peer nodes 106a-106e may be collectively referred to as serving peer node 106. Server 102 is a node in P2P network 100 that originates streaming media that is to be transferred to client node 104 and serving peer nodes 106; client node 104 requests the streaming media; and serving peer nodes 106 sends a complete or partial copy of the streaming media to client node 104.

In an implementation, server 102, client node 104, and serving peer nodes 106 are all end-user nodes connected to a network, such as the Internet. Further, it should be noted that nodes of P2P system 100 (e.g. client node 104 and serving peer nodes 106) may act as a client node in a particular streaming session (e.g. requesting the streaming media) while acting as a serving peer node in a differing streaming session (e.g. sending a complete or partial copy of the streaming media). Also, any node of P2P system 100 (e.g. client node 104 and serving peer nodes 106) may simultaneously act as both a client node and a serving peer node to simultaneously stream one or more media files, or portions of media files, while receiving other streaming media from one or more serving peer nodes 106.

Client nodes 104 and peer serving nodes 106 each may include a media buffer 108 and a buffer map 110. Media buffer 108 includes a first-in-first-out (FIFO) packet queue to accommodate received packets of the media stream. The packet queue has a fixed size L, and in an example, has a size of 2048. If media buffer 108 is full, the oldest packet is removed as a new packet arrives. Buffer map 110 is a bit vector, and in one implementation, has a size of L/2. Each bit in buffer map 110 represents the availability of a single packet in media buffer 108. Given the start sequence number and buffer map 110, it may be determined which media packets are available in its packet queue. During streaming, client node 104 and serving peer nodes 106 periodically publishes their buffer map 110 to remaining nodes of P2P system 100. Based on the exchange of buffer maps 110, client node 104 knows which packets can be fetched from serving peer nodes 106.

Streaming Media Model

In general, streaming media includes a stream of packets that are decoded and rendered as they arrive at a destination (e.g. client, peer, etc.). Each packet of the streaming media may have a unique sequence number which is assigned by a hosting program, and the sequence number is used as an index of the video packet. Furthermore, the streaming media may be divided into P strips, and a packet with sequence numbers belongs to the strip (s mod P).

Figure 2:
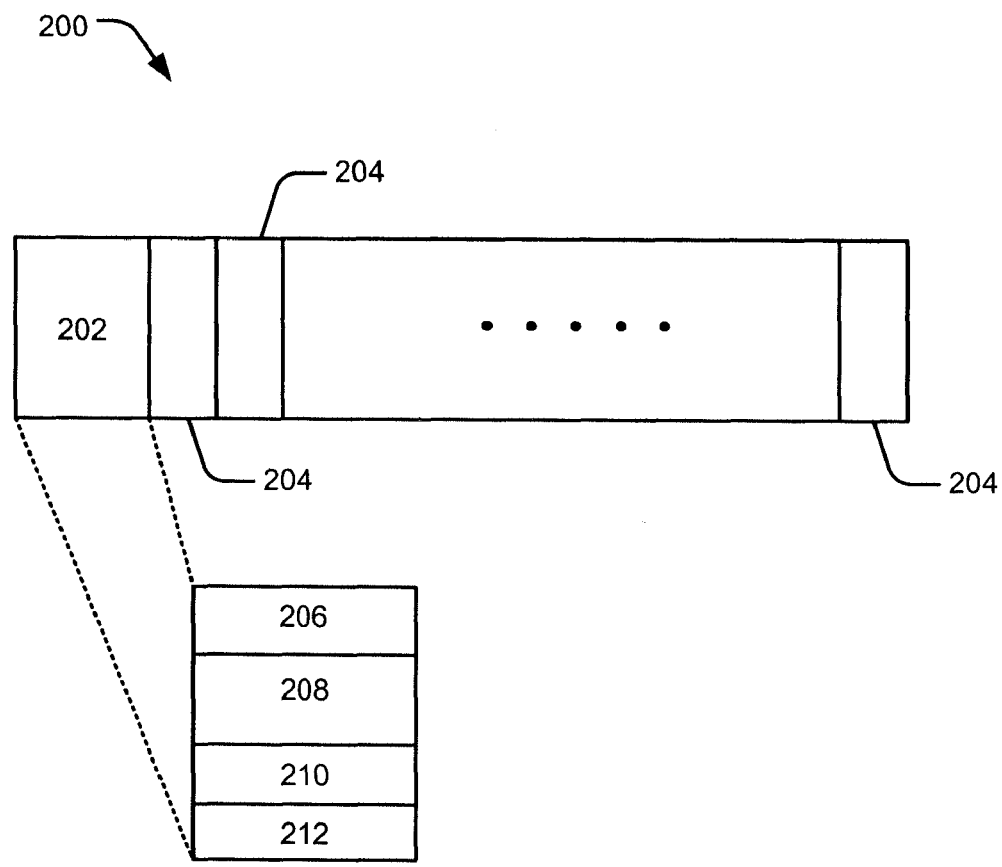
FIG. 2 is a block diagram of a packet of streaming media.

FIG. 2 shows a packet 200 that is sent from serving nodes 106 to client peer node 104. Packet 200 includes a packet header 202 and data (media) packets 204. Packer header 202 includes a sequence number field 206, a round trip time (RTT) field 208, current sending rate field 210, and current queue size filed 212. Packet header 202 may include other information describing packets 204 including, but not limited to, number of channels, properties of and characteristics of each channel, codes used, and author/copyright holder of the media.

Figure 3:
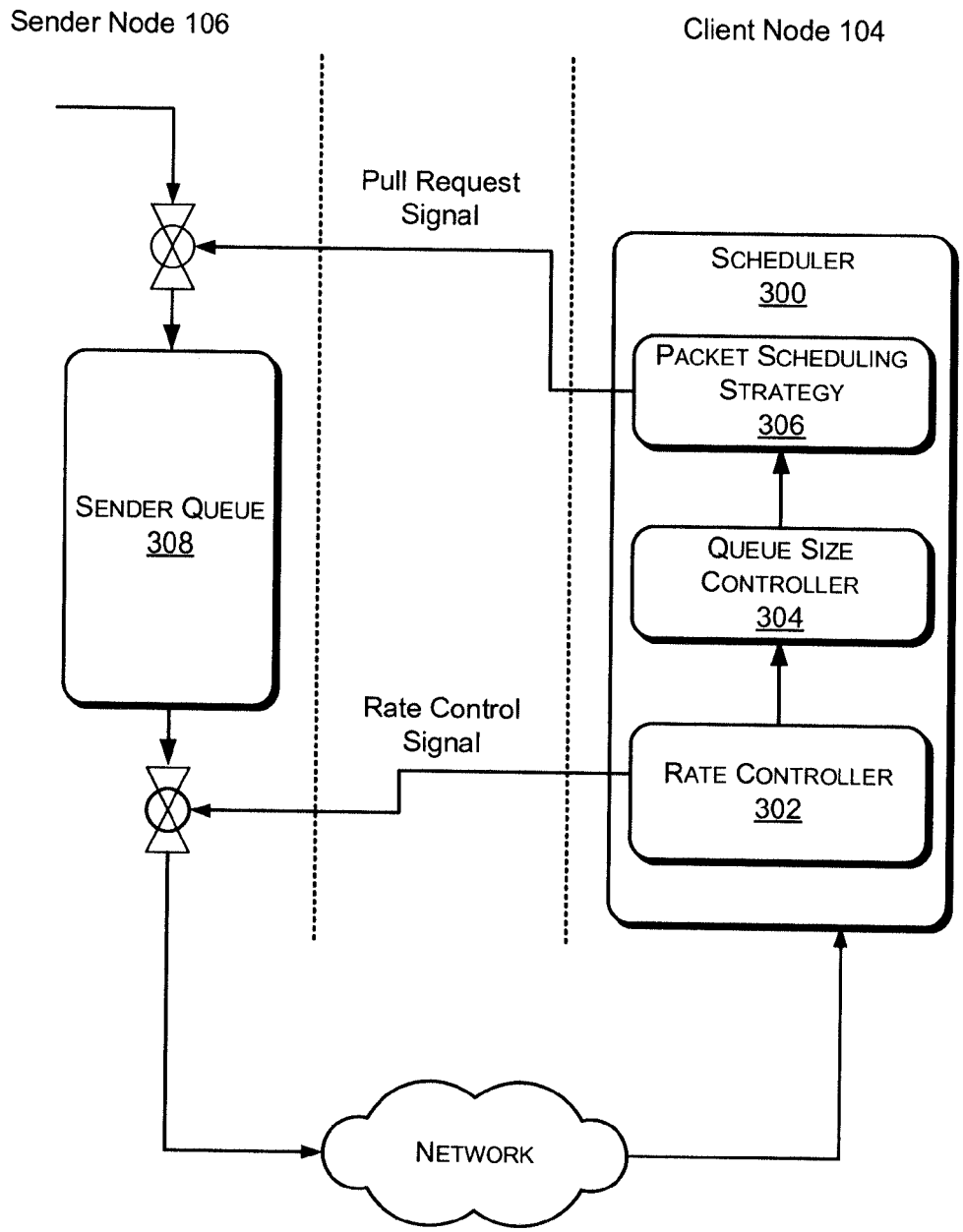
FIG. 3 is a simplified block diagram of a pull based packet scheduling algorithm between a client node and a serving node.

FIG. 3 shows a simplified view of a portion of P2P network 100 of FIG. 1. More specifically, client node 104 includes a scheduler 300 including a rate controller 302, a queue size controller 304, and a packet schedule strategy 306. Given the bandwidth budget of each serving peer 106, a packet schedule strategy is employed to determine which media packet is requested from which serving peer 106. The packet schedule strategy maximized the utilization of the uploading bandwidth of serving peer nodes 106.

Rate Controller 202

Rate controller 202 is a receiver-driven congestion control algorithm based on additive-increase, multiplicative-decrease (AIMD) congestion control. Upon reception of packet 200 by client node 104, client node 104 detects a link status between client node 104 and client serving peer 106. Client node 104 then calculates the sending rate of packet 300 and sends a rate control message to serving peer node 106, if necessary.

Figure 4:
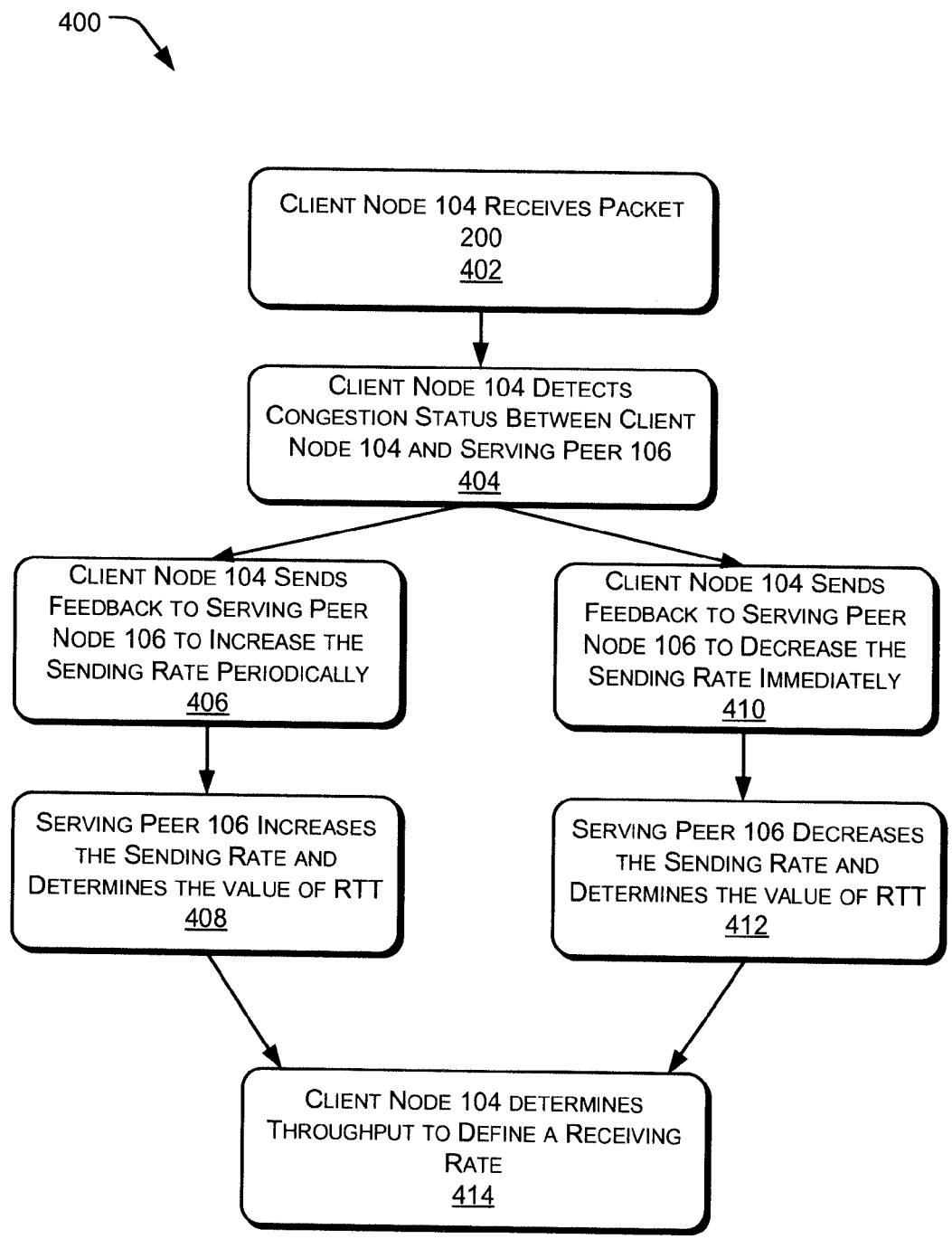
FIG. 4 is a flowchart illustrating a method of a rate control function of the scheduling algorithm of FIG. 3.

FIG. 4 shows an overview of a process 400 of the rate control function employed when client node 104 receives packet 200 from serving peer node 106. At step 402, client node 104 receives packet 200. At step 404, client node 104 detects a current link status of the link from serving peer node 106 to client node 104. The link status may be determined by first calculating the loss event rate through a method proposed in TCP friendly rate control (TFRC) and subsequently using the loss event rate to detect the link status. Specifically, if the loss event rate increases, the link status of the link from serving peer node 106 to client node 104 is congested; otherwise, it is not congested.

At step 406, if no congestion from serving peer node 106 to client node 104 is detected, client node 104 increases the sending rate and sends it as a feedback (namely rate increase feedback) to serving peer node 106 periodically. At step 408, serving peer node 106 updates the sending rate to the increased value according to the feedback from client node 104 and determines the value of RTT.

At step 410, if congestion from serving peer node 106 to client node 104 is detected, client node 104 decreases the sending rate and sends it as a feedback (namely rate decrease feedback) to serving peer node 106 immediately. At step 412, serving peer node 106 updates the sending rate to the decreased value according to the feedback from client node 104 and determines the value of RTT.

At step 414, client node 104 determines the throughput based on a number of packets 200 received during a time period to define a receiving rate of packets 200 by client node 104. A variation of the receiving rate over time may be much smaller than a variation of the sending rate.

Figure 5A:
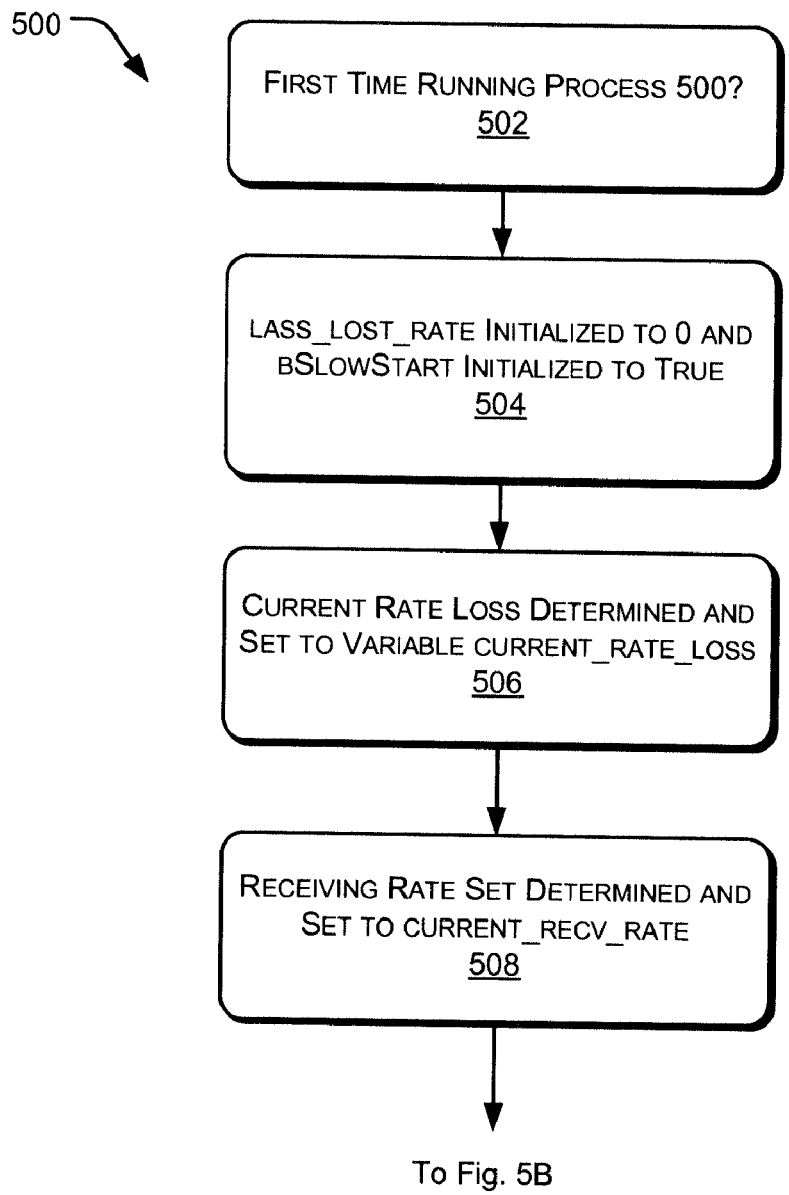
FIG. 5 is a flowchart illustrating a method of a rate control function of the scheduling algorithm of FIG. 3.
Figure 5B:
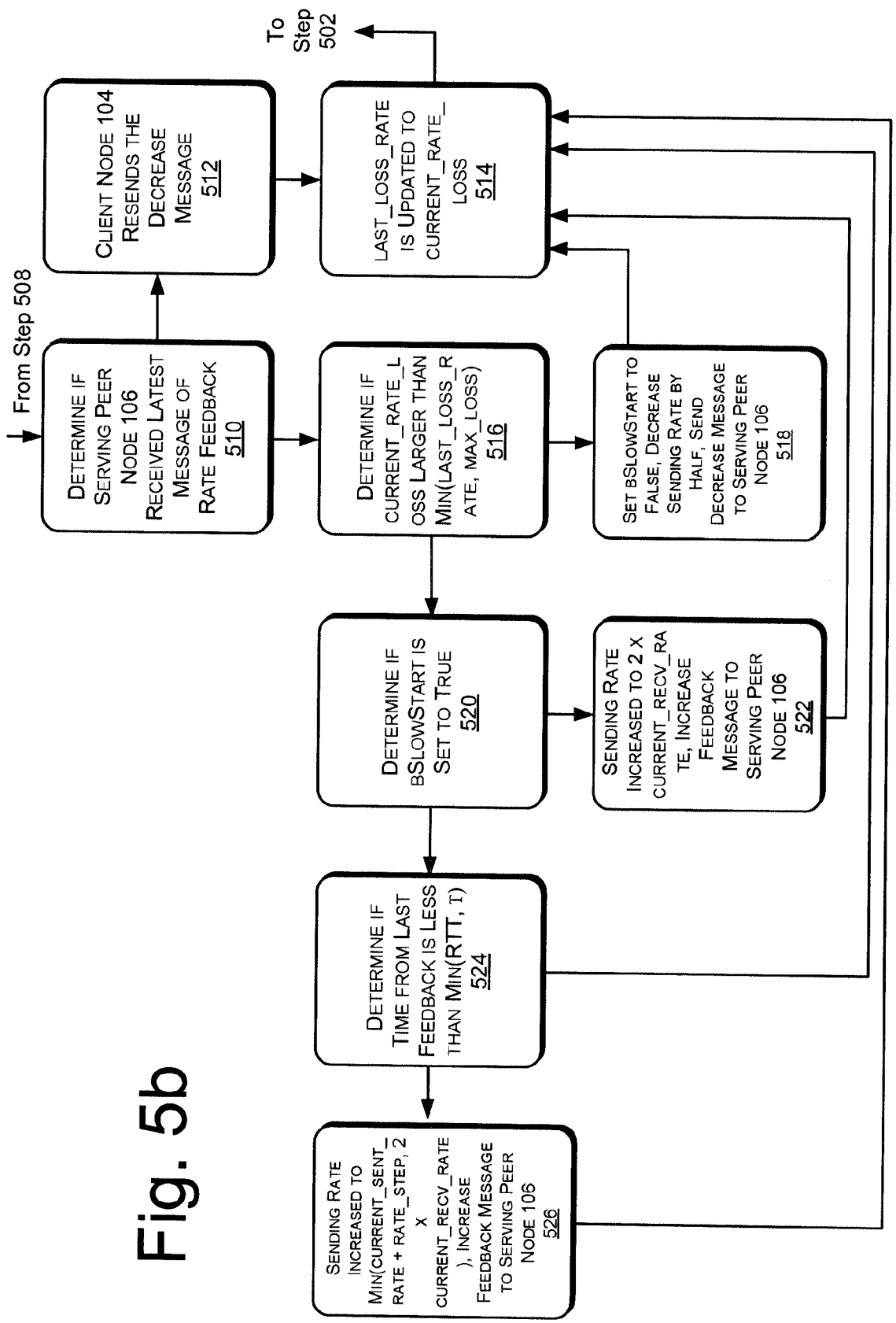

FIGS. 5a and 5b show a detailed description of a process 500 of the rate control function employed whenever client node 104 receives packet 200 from serving peer node 106. The main process descried at FIG. 5 is implemented at the receiver side.

At step 502, it is determined whether this is the first time entering process 500. At step 504, if it is the first time entering process 500, the variable last_loss_rate is initialized to 0 and the variable bSlowStart is initialed to true. At step 506, the current rate loss is determined and set to the variable current_loss_rate. At step 508, the receiving rate is determined and set to the variable current_recv_rate.

At step 510, it is determined if serving peer node 106 has received the latest message of rate decrease feedback from client node 104 after a time period (e.g. RTT). If the latest message of rate decrease feedback has not been received, then at step 512, client node 104 resends the decrease message. At step 514, the value of last_loss_rate is updated to current_rate_loss and the process returns to step 502

If the latest message of rate decrease feedback has been received, than at step 516, it is determined if current_rate_loss is larger than the minimum of last_loss_rate and max_loss [MIN(last_loss_rate, max_loss)]. Here, max_loss is an empirical threshold, and set to 0.01 in the present implementation. If the current_rate_loss is larger than the minimum of last_loss_rate and max_loss, then at step 518, set the value of bSlowStart to false, decrease the sending rate to half of its value, and send a decrease feedback message to serving peer node 106. The process proceeds to step 514. If the current_rate_loss is less than the minimum of last_loss_rate and max_loss, then at step 520, it is determined if bSlowStart is set to true.

If bSlowStart is set to true, then at step 522, the sending rate is increased to 2×current_recv_rate, and send an increase feedback message to serving peer node 106. The process proceeds to step 514. If bSlowStart is set to false, than at step 524, it is determined if the time from last feedback is less than the maximum of RTT and τ [MAX(RTT, τ)]. Here, τ is an empirical threshold, and set to 200 ms in the present implementation. If the time from last feedback is less than the maximum of RTT and τ, the process proceeds to step 514. If the time from last feedback is greater than the maximum of RTT and τ, at step 526, the sending rate is increased to the minimum of current_sent_rate+rate_step and 2×current_recv_rate [MIN(current_send_rate+rate step, 2×current_recv_rate)] and an increase feedback message is then sent to client serving peer 106. The process proceeds to step 514.

The rate_step is calculated based on the one way delay of the forward link between client node 104 and serving peer node 106, and in an example, 6 Kbps.

Queue Size Controller 204

Queue size controller 304 determines a bandwidth budget for each pull channel during each scheduling round, i.e. the bandwidth budget for each serving peer node 106 in P2P network 100. The serving peer nodes 10 maintain a sender queue 308 for each link from itself to the client node 104. Queue size controller 304 minimizes buffer underflow and overflow in sender queue 308 of sending peer nodes 106 when client node 104 schedules packets from sending peer nodes 106.

Figure 6:
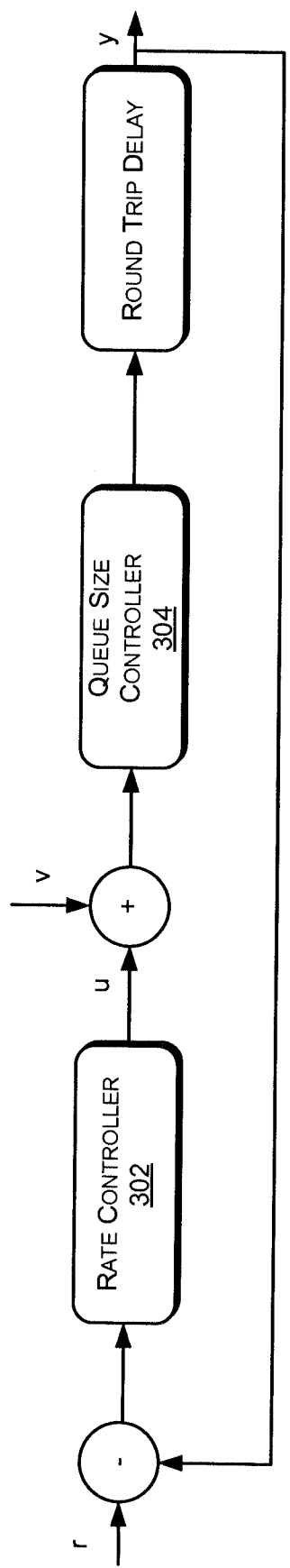
FIG. 6 is a control model of a queue size controller.

FIG. 6 shows a control model 600 of queue size controller 304. The transfer function of control model 600 is defined as follows:

$$y_{(k)} = y_{(k-1)} + u_{(k-d)} + v_{(k-d)} \quad (1)$$

wherein u is the bandwidth budget of serving peer node 106, v is the number of received packets 200 by client node 104 in each scheduling round, y is the size of sender queue 308 of serving peer node 106, and d is the RTT.

Based on the theory of minimum variance control, the bandwidth budget u may be calculated by the following equation:

$$u_{(k)} = r - y_{(k)} - \Sigma_{i=1}^{d-1} u_{(k-i)} + \Sigma_{i=0}^{d-1} v_{(k-i)} \quad (2)$$

wherein r is the targeting queue size of controller 304.

The value of y (the size of sender queue 308 of serving peer node 106) may be included in packet header 202 of packet 200 and thus the value of y may be sent to client node 104 in each pull round. The value of v may be determined by client node 104 by counting the number of packets 200 received during each pull round. To that end, the value of r may be chosen with the tradeoff between the following properties:

- a large value of r causes a larger time delay of transmission of packet 200 to client node 104; and
- a smaller value of r leads to a higher probability of queue underflow, thus degrades the performance of rate controller 302.

To that end, the value of r may be chosen via the following equation:

$$r_k = \alpha \times r_{k-1} + 2(1-\alpha) d \times v_k \qquad (3)$$

where, in an example, $\alpha$ has a value of 0.95 and $r_0$ have a value of 10.

Benefits of Receiver-Driven Budget Allocation Algorithm

Employing the aforementioned receiver-driven budget allocation algorithm offers the following benefits which can improve the bandwidth utilization in P2P network 100.

- The protocol machinery (rate controller 302 and queue size controller 304) are implemented at client node 104, e.g. congestion detection and sending rate calculation is performed at client node 104. Thus, the rate control decision is not influenced by the congestion of acknowledgement (ACK) packets.
- As mentioned above, packet 200 includes current sending rate field 210 in packet header 202. Based on the current sending rate filed 210, the rate increase/decrease feedback is calculated based on the latest sending rate. As a result, client node 104 does not store a local version of the sending rate, and thus, the consistency problem caused by feedback losses and delay may be minimized, if not avoided.
- The sending/receiving rates may be frozen if serving peer node 106 is not currently sending packets to client node 104. Freezing the state of rate controller 302 may increase a speed of the convergence of rate controller 302 and further improve the bandwidth utilization.
- For the multiplicative rate decrease feedback, rate controller 200 employs a timeout and re-transmission mechanism to ensure serving peer node 106 receives the feedback. Concurrently, client node 104 does not increase/decrease the sending rate until the previous decrease feedback has been received by peer serving node 106.
- The uploading bandwidth can be fully utilized because the queue size controller can avoid the queue underflow.

An Exemplary Computer Environment

Figure 7:
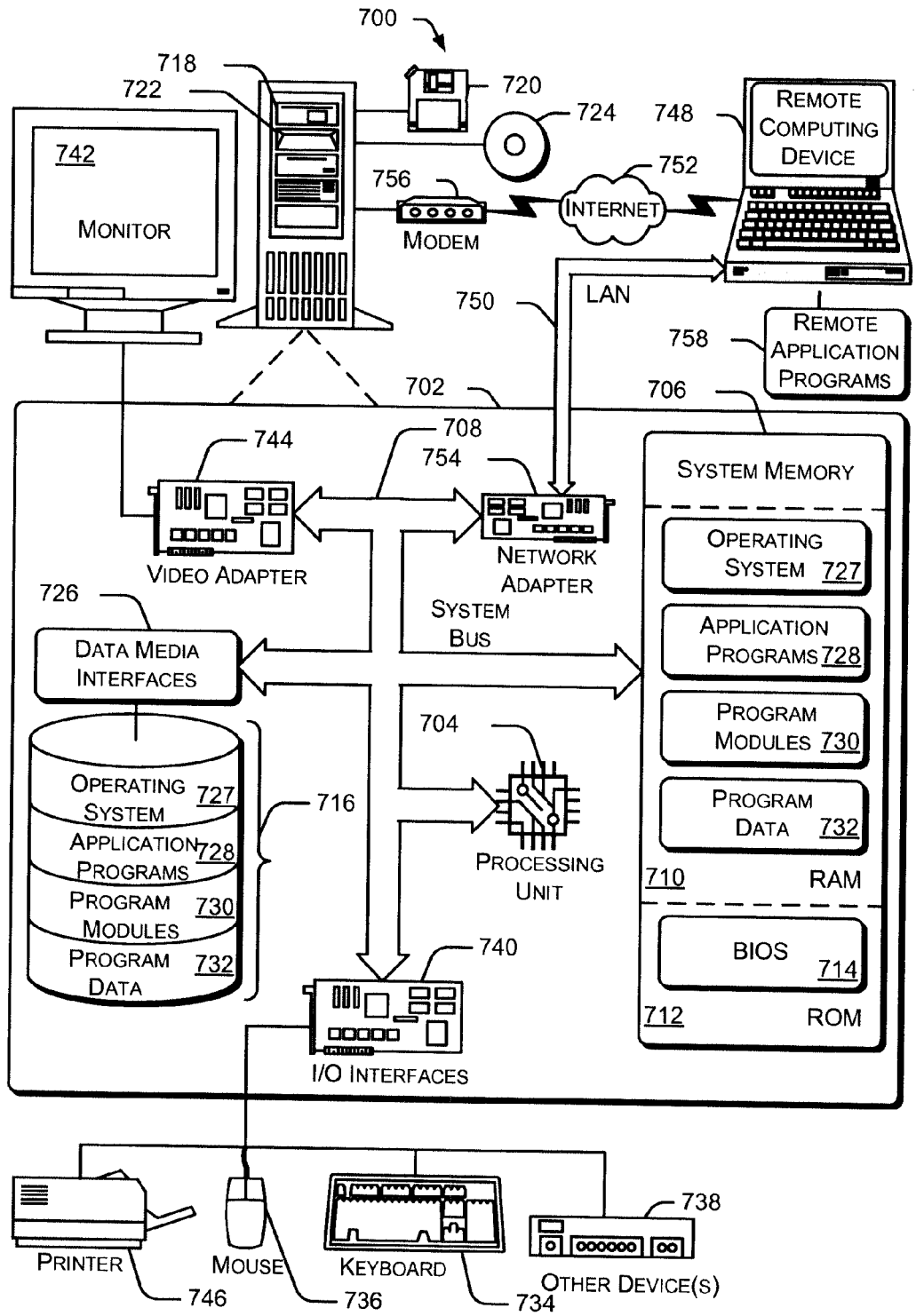
FIG. 7 is a block diagram illustrating an exemplary computing environment.

FIG. 7 illustrates an exemplary general computer environment 700, which can be used to implement the techniques described herein, and which may be representative, in whole or in part, of elements described herein. The computer environment 700 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 700.

Computer environment 700 includes a general-purpose computing-based device in the form of a computer 702. Computer 702 can be, for example, a desktop computer, a handheld computer, a notebook or laptop computer, a server computer, a game console, and so on. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712 is illustrated. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown). Furthermore FIG. 7 illustrates a magnetic disk drive 718 for reading from and writing to a removable, non-volatile magnetic disk 720 (e.g., a "floppy disk"), additionally FIG. 7 illustrates an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternately, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more applications 728, other program modules 730, and program data 732. Each of such operating system 726, one or more applications 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746, which can be connected to computer 702 via the input/output interfaces 740.

Computer 702 can operate in a networked environment using logical connections to one or more remote computers, such as a remote computing-based device 748. By way of example, the remote computing-based device 748 can be a personal computer, portable computer, a server, a router, a network computer, a peer device or other common network node, and the like. The remote computing-based device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote applications 758 reside on a memory device of remote computer 748. For purposes of illustration, applications and other executable program components such as the operating system are illustrated herein as discrete blocks, although it is recognized that such programs and components reside at various times in different storage components of the computing-based device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations for providing remote auto provisioning and publication of applications.

What is claimed is:

1. A method of altering a sending rate of media packets in a peer-to-peer network that includes a client node and a plurality of serving peer nodes, the method comprising:
    receiving a packet by the client node from a serving peer node of the plurality of serving peer nodes at a current receiving rate;
    determining a current loss rate of the packet;
    determining the current receiving rate of the packet;
    detecting a link status of a link from the serving peer node to the client node based in part on determining if the current loss rate is larger or smaller than a minimum of a last loss rate and a max loss; and
    sending feedback to the serving peer node based on the link status to alter the sending rate in accordance with an updated sending rate specified in the feedback, the feedback including:
        if the current loss rate is smaller than the minimum of the last loss rate and the max loss, a message indicating increasing the sending rate to twice the receiving rate for congestion not being detected between the client node and the serving peer node; and
        if the current loss rate is larger than the minimum of the last loss rate and the max loss, a message indicating decreasing the sending rate to half for the congestion being detected between the client node and the serving peer node.

2. A method as recited in claim 1, further comprising a round trip time of the packet specified in the packet.

3. A method as recited in claim 1, further comprising determining a throughput based upon a number of received packets in a time period to define the receiving rate of the client node.

4. A method as recited in claim 1, wherein sending rate calculation does not depend upon acknowledgement packets.

5. A method as recited in claim 1, wherein the packet comprises a field having a value of the sending rate therein.

6. A method as recited in claim 3, wherein a value of the sending rate and the receiving rate may be frozen if the serving peer node is not sending the packet to the client node.

7. A method as recited in claim 1, further comprising not altering the sending rate until the decrease feedback has been received by the serving peer node.

8. One or more computer readable medium including computer readable instruction that, when executed, perform the method of claim 1.

9. A method of altering a sending rate from a current sending rate of media packets in a peer-to-peer network that includes a client node and a plurality of serving peer nodes, the method comprising:
   initializing a last loss rate to 0;
   determining a current loss rate of sending a packet to the client node from a serving peer node of the plurality of serving peer nodes;
   determining a current receiving rate of the packet;
   determining if the current loss rate is larger than a minimum of a last loss rate and a max loss; and
   sending feedback to the serving peer node based on the current loss rate comprising:
      increasing the sending rate to twice the current receiving rate for the current loss rate being smaller than the minimum of the last loss rate and the max loss; and
      decreasing the sending rate to half for the current loss rate being larger than the minimum of the last loss rate and the max loss.

10. A method as recited in claim 9, further comprising updating the last loss rate to the current sending rate after the serving peer node alters the sending rate.

11. A method as recited in claim 9, further comprising determining if the serving peer node received last feedback message prior to the serving peer node altering the sending rate.

12. A method as recited in claim 9, wherein the sending feedback comprises determining if a time from last feedback received by the serving peer node is less than a round trip time of the packet, and increasing the sending rate to a minimum of the current sending rate plus a rate step and twice the current receiving rate, if the current receiving rate is smaller than the minimum of the last loss rate and the max loss.

13. A method as recited in claim 9, wherein the sending rate does not depend upon acknowledgement packets.

14. A method as recited in claim 9, wherein the packet comprises a field having a value of the sending rate therein.

15. A method as recited in claim 9, wherein a value of the sending rate and the receiving rate may be frozen if the serving peer node is not sending the packet to the client node.

16. A method as recited in claim 9, further comprising not altering the sending rate until the decrease feedback has been received by the serving peer node.

17. One or more computer readable medium including computer readable instruction that, when executed, perform the method of claim 9.

18. A client node computer in a peer-to-peer network that includes a plurality of serving peer nodes, the client node computer comprising:
   a queue size controller to calculate a bandwidth budget of links from the plurality of serving peer nodes to the client node by controlling a size of sender queues of the plurality of serving peer nodes; and
   a rate controller to:
      determine a current loss rate of sending a packet to the client node from a serving peer node of the plurality of serving peer nodes;
      determine a current receiving rate of the packet;
      determine if the current loss rate is larger or smaller than a minimum of a last loss rate and a max loss;
      send feedback to the serving peer node based on a link status between the client node and the serving peer node to alter a sending rate, the feedback including:
         if the current loss rate is determined as smaller than the minimum of the last loss rate and the max loss, a message indicating increasing the sending rate to twice a current receiving rate by the client node for congestion not being detected between the client node and the serving peer node; and
         if the current loss rate is determined as larger than the minimum of the last loss rate and the max loss, a message indicating decreasing the sending rate to half for the congestion being detected between the client node and the serving peer node.

19. A client node computer as recited in claim 18, wherein the sending rate calculation of the controller does not depend upon acknowledgement packets.

20. A client node computer as recited in claim 18, wherein the packet comprises a field having a value of the sending rate therein.

* * * * *